United States Patent
Yanada

(10) Patent No.: US 7,733,411 B2
(45) Date of Patent: Jun. 8, 2010

(54) IMAGE CAPTURING APPARATUS PERFORMING FILTERING PROCESS WITH VARIABLE CUT-OFF FREQUENCY

(75) Inventor: Takashi Yanada, Inagi (JP)

(73) Assignee: Olympus Corporation, Tokyo (JP)

( * ) Notice: Subject to any disclaimer, the term of this patent is extended or adjusted under 35 U.S.C. 154(b) by 917 days.

(21) Appl. No.: 11/542,569

(22) Filed: Oct. 4, 2006

(65) Prior Publication Data

US 2007/0081173 A1    Apr. 12, 2007

(30) Foreign Application Priority Data

Oct. 7, 2005    (JP)    ............... 2005-294509

(51) Int. Cl.
*H04N 5/232* (2006.01)
*G03B 13/00* (2006.01)

(52) U.S. Cl. .................. 348/345; 348/241; 348/222.1

(58) Field of Classification Search .............. 348/222.1, 348/241, 345, 348, 349, 355
See application file for complete search history.

(56) References Cited

U.S. PATENT DOCUMENTS 6,362,852 B2 *   3/2002   Ito ............................ 348/345
6,710,806 B1 *   3/2004   Satoh ........................ 348/350
2003/0123870 A1 *  7/2003   Yoshida et al. .............. 396/121

FOREIGN PATENT DOCUMENTS

JP    10-233950 A    9/1998
JP    2001-255450 A    9/2001

* cited by examiner

*Primary Examiner*—Gevell Selby
(74) *Attorney, Agent, or Firm*—Westerman, Hattori, Daniels & Adrian, LLP

(57) ABSTRACT

An image capturing apparatus includes an optical system having distortion aberration for expanding a central part and compressing a peripheral part of an object; a filtering device for cutting low-frequency components of each image signal; a filter setting device for assigning: first coefficients for cutting frequencies equal to or lower than a first frequency to an image area corresponding to the central part, and second coefficients for cutting frequencies equal to or lower than a second frequency higher than the first frequency to an image area corresponding to the peripheral part; a device for integrating each image signal and generating an evaluation value; a device for performing area division based on data relating to divided areas formed by dividing an effective image area, by setting each divided area for the integration device; and a device for controlling focusing based on the evaluation value with respect to each divided area.

11 Claims, 11 Drawing Sheets

FIG. 4
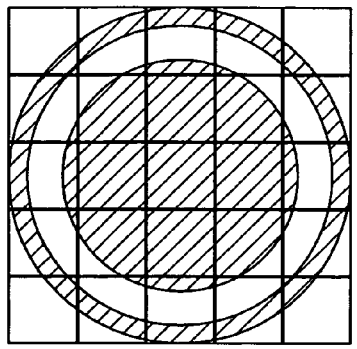
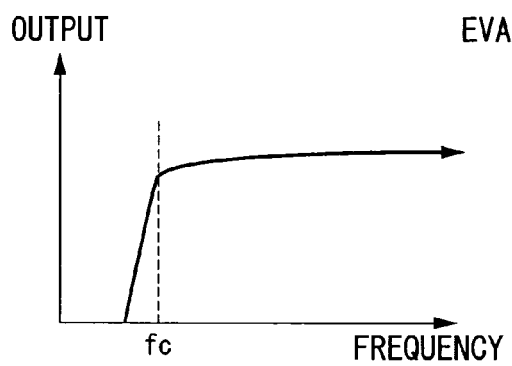
FIG. 5A
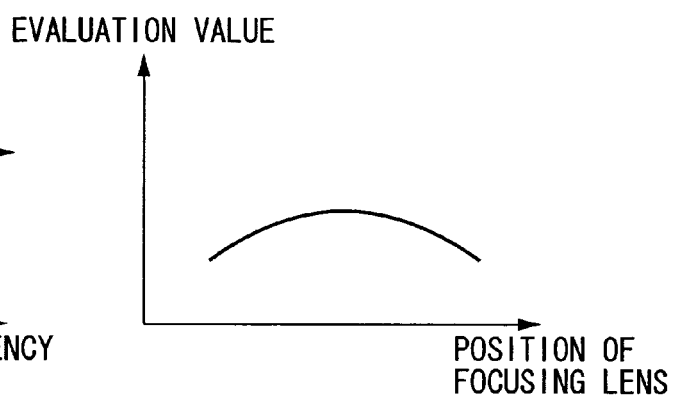
FIG. 5B
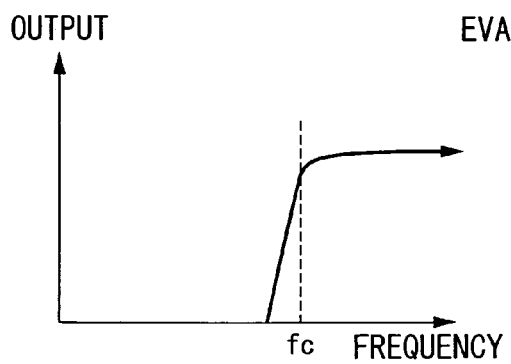
FIG. 5C
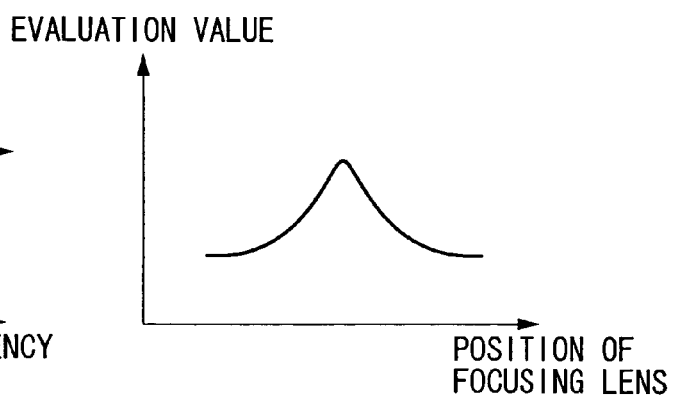
FIG. 5D

IMAGE CAPTURING APPARATUS PERFORMING FILTERING PROCESS WITH VARIABLE CUT-OFF FREQUENCY

BACKGROUND OF THE INVENTION

1. Field of the Invention

The present invention relates to an image capturing apparatus having an automatic focusing function.

Priority is claimed on Japanese Patent Application No. 2005-294509, filed Oct. 7, 2005, the content of which is incorporated herein by reference.

2. Description of the Related Art

In image input apparatuses such as video cameras or digital cameras, a zoom function is widely used for freely expanding or contracting the image in accordance with the distance to a subject to be photographed, or the size of the subject in the angular field, whereby it is executed by changing the focal length of the lens. The zoom function is classified into: (i) optical zooming generally implemented by mechanically moving internal lenses, and (ii) electronic zooming for performing image expansion by using a part of the image output from the image sensor and interpolating new pixels between existing pixels so as to generate an interpolated image. In comparison with the optical zooming, the electronic zooming includes no elements to be driven, and can be realized as a small device at low cost; however, image quality thereof is inferior.

With respect to such a problem, Japanese Unexamined Patent Application, First Publication No. H10-233950 discloses an electronic zoom image input system (see FIG. 12) having: an optical system for optically compressing a periphery of an input image; and a light receiving element, having a substantially uniform pixel density, for photo-detecting the input image. This electronic zoom image input system has a function of correcting and converting the image which is detected by the light receiving element and includes distortion due to the above compression, thereby producing a zoom image having a resolution equivalent to the optical zooming.

FIG. 12 shows a telephoto angular-field image plane 1AS, a middle angular-field image plane 1AM, and a wide-area angular-field image plane 1AW on a subject plane 1A. These planes 1AS, 1AM, and 1AW respectively correspond to image planes 1BS, 1BM, and 1BW (with respect to compression) formed on the photodetective plane of an imaging device. Image data captured through the photodetective plane is appropriately corrected, so that a telephoto angular-field image plane 1CS, a middle angular-field image plane 1CM, and a wide-area angular-field image plane 1CW are each captured as a corrected zoom image plane 1C (i.e., a converted normal image). Accordingly, electronic zooming can be performed without degrading general resolution while the resolution varies locally.

On the other hand, Japanese Unexamined Patent Application, First Publication No. 2001-255450 discloses an automatic focusing method used in an image input apparatus such as a video camera or a digital camera. FIG. 13 shows a block diagram relating to the disclosed method.

In FIG. 13, light incident via a focusing lens 100 is subjected to photoelectric conversion in a CCD element 101, thereby generating image signals which are each converted to a digital signal by an A/D converter. This digital signal is input into a signal processing circuit 103 in which the signal is subjected to correction processes such as white balance correction, γ correction, and the like. The processed signals are sequentially stored in a DRAM 104.

In a processing circuit 105, each image signal read out from the DRAM 104 is subjected to a signal processing such as color separation. Each image signal processed by the processing circuit 105 is stored in a storage medium 106.

Each image signal stored in the DRAM 104 is also supplied to a gate circuit 107. Based on a command issued from a CPU 112, the gate circuit 107 assigns each image signal to one of a plurality of independent areas, so as to set focusing areas (in FIG. 13, a control line between the gate circuit 107 and the CPU 112 is not shown).

Each image signal assigned to any one of the independent areas by the gate circuit 107 is converted to a brightness signal by a brightness signal generating circuit 108, which is then supplied to a HPF (high-pass filter) 109 and a LPF (low-pass filter) 110. The HPF 109 extracts a high-frequency signal component from each brightness signal, and sends the extracted signal component to an integrator 111. The integrator 111 integrates the high-frequency signal component, and sends the result of the integral to the CPU 112 as a focus evaluation value. The LPF 119 extracts a low-frequency signal component from each brightness signal, and sends the extracted signal component to the integrator 111. The integrator 111 integrates the low-frequency signal component, and sends the result of the integral to the CPU 112 as brightness data. Based on each focus evaluation value obtained by the integrator 111, the CPU 112 drives a motor 113 for changing the position of the focusing lens 100, so as to perform focusing.

As the method of driving the motor 113 for focusing, a so-called "hill-climbing control method" is used in the above example. Each focusing area has a position at which the focus evaluation value is maximum. The CPU 112 determines that the nearest position (to the camera) of such positions of the focusing areas is a focal position to be set, and drives the motor 113 so as to move the focusing lens to the focal position. Such control is performed because generally in camera photography (in particular, when taking portraits), a desired subject to be photographed is present near to the camera, while distant objects belong in the background. As discussed above, the focal position is determined by monitoring the variations in the focus evaluation values computed with respect to the plurality of focusing areas; thus, focusing can be appropriately performed for various types of subjects.

In each image obtained by the image input apparatus disclosed in the above publication H10-233950, a central part and a peripheral part have different characteristics. That is, the central part, in which the image is expanded, includes a large number of low-frequency signal components, while the peripheral part, in which the image is compressed, includes a large number of high-frequency signal components. In camera photography (in particular, in order to take portraits), a desired subject is generally positioned near to the camera and in the central part of the image, as discussed above.

SUMMARY OF THE INVENTION

The present invention provides an image capturing apparatus comprising:

an optical system having distortion aberration characteristics for expanding a central part and compressing a peripheral part of an object to be photographed;

an image sensor for photodetecting an optical image obtained through the optical system, converting the optical image to image signals, and outputting the image signals;

an A/D converting device for converting each image signal output from the image sensor into a digital signal;

a filtering device for performing a filtering process for cutting low-frequency signal components of the image signal which has been converted into the digital signal;

a filter coefficient setting device for selecting and assigning:

first filter coefficients for cutting the low-frequency signal components, which have frequencies equal to or lower than a first frequency, to an image area corresponding to the central part, and second filter coefficients for cutting the low-frequency signal components, which have frequencies equal to or lower than a second frequency which is higher than the first frequency, to an image area corresponding to the peripheral part, wherein the filter coefficient setting device provides the selected filter coefficients to the filtering device;

an integration device for integrating each image signal which was subjected to the filtering process by the filtering device, so as to generate an evaluation value;

an area dividing device for performing area division based on area data relating to divided areas formed by dividing an effective image area into smaller areas, wherein the area dividing device sets each divided area for executing the integral and generating the evaluation value, for the integration device; and a control device for controlling focusing of the optical system based on the evaluation value with respect to each divided area.

In a preferable example, the image capturing apparatus further comprises:

a plurality of units, each unit including the filtering device and the integration device, for generating the evaluation values assigned to different divided areas; and an integral output switching device for selecting one of the units and providing a signal output from the selected unit to the control device.

Preferably, the filtering devices of the units have different cut-off frequencies.

The present invention also provides an image capturing apparatus comprising:

an optical system having distortion aberration characteristics for expanding a central part and compressing a peripheral part of an object to be photographed;

an image sensor for photodetecting an optical image obtained through the optical system, converting the optical image to image signals, and outputting the image signals;

an A/D converting device for converting each image signal output from the image sensor into a digital signal;

a filtering device for performing a filtering process for cutting low-frequency signal components of the image signal which has been converted into the digital signal;

an integration device for integrating each image signal which was subjected to the filtering process by the filtering device, so as to generate an evaluation value;

an area dividing device for performing area division based on area data relating to sizes of divided areas formed by dividing an effective image area into smaller areas in accordance with the distortion aberration characteristics, wherein the area dividing device sets each divided area for executing the integral and generating the evaluation value, for the integration device; and a control device for controlling focusing of the optical system based on the evaluation value with respect to each divided area.

In a preferable example, the image capturing apparatus further comprises:

a filter coefficient setting device for selecting and assigning:

first filter coefficients for cutting the low-frequency signal components, which have frequencies equal to or lower than a first frequency, to an image area corresponding to the central part, and second filter coefficients for cutting the low-frequency signal components, which have frequencies equal to or lower than a second frequency which is higher than the first frequency, to an image area corresponding to the peripheral part, wherein the filter coefficient setting device provides the selected filter coefficients to the filtering device;

The image capturing apparatus may further comprise a multiplication device for multiplying the evaluation value by a coefficient for normalizing the evaluation value in accordance with the size of each divided area.

On the other hand, the image capturing apparatus may further comprise:

a plurality of units, each unit including the filtering device and the integration device, for generating the evaluation values assigned to different divided areas; and an integral output switching device for selecting one of the units and providing a signal output from the selected unit to the control device.

In this case, the image capturing apparatus may further comprise:

a multiplication device, provided for each unit, for multiplying the evaluation value by a coefficient for normalizing the evaluation value in accordance with the size of each divided area, wherein:

the integral output switching device regards a signal output from the multiplication device assigned to each unit as a signal output from the unit, and provides the signal output from the selected unit to the control device.

Preferably, the filtering devices of the units have different cut-off frequencies.

In each image capturing apparatus as described above, the filtering device has a further setting in which with respect to the image area corresponding to the central part, high-frequency signal components which have frequencies equal to or higher than a third frequency higher than the first frequency are also cut.

BRIEF DESCRIPTION OF THE DRAWINGS

FIG. 4 is a diagram showing an example of image area division performed in the first embodiment.

FIGS. 5A and 5C are diagrams showing examples of the cut-off frequency of the high-pass filter, and FIGS. 5B and 5D are diagrams showing examples of the evaluation value obtained by the integrator in the first embodiment.

DESCRIPTION OF THE PREFERRED EMBODIMENTS

Figure 1:
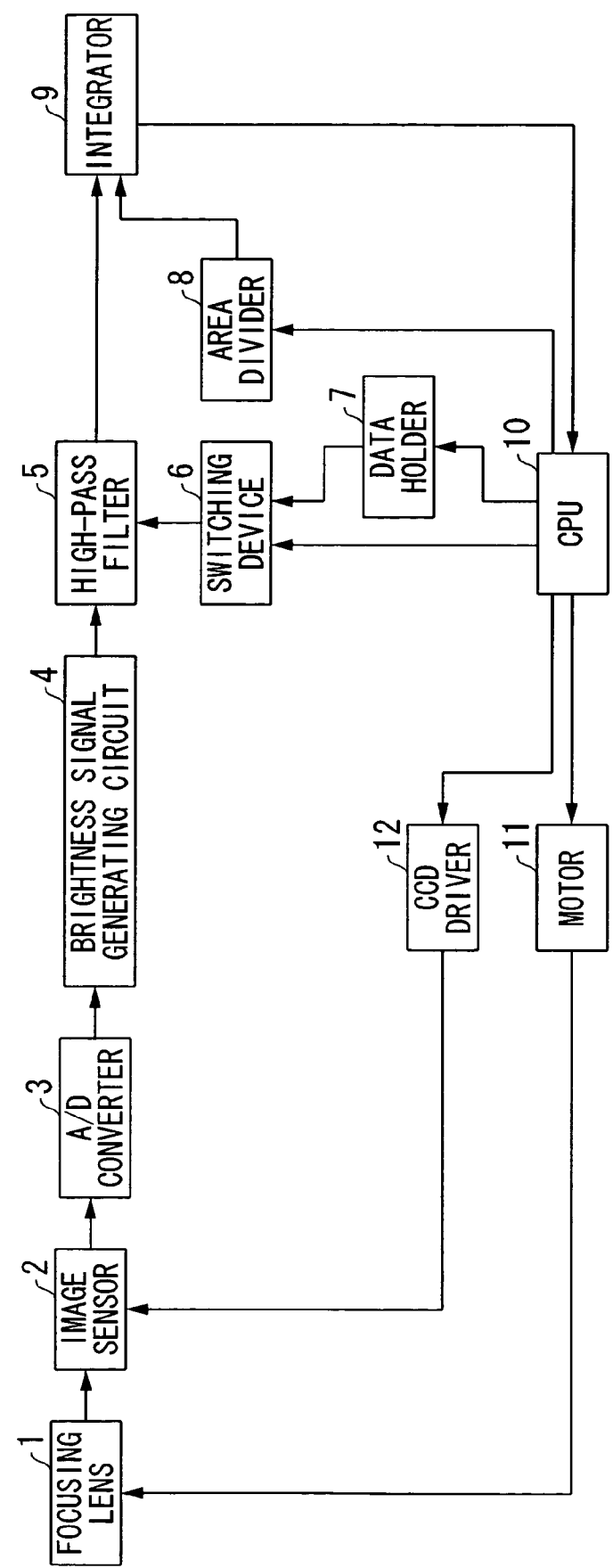
FIG. 1 is a block diagram showing the structure of the image capturing apparatus as a first embodiment in accordance with the present invention.

Hereinafter, embodiments according to the present invention will be described with reference to the appended figures. In each figure, identical parts are given identical reference numerals, and explanations thereof are not duplicated.

A first embodiment of the present invention will be explained first. FIG. 1 is a block diagram showing the structure of the image capturing apparatus of the present embodiment.

Figure 2A:
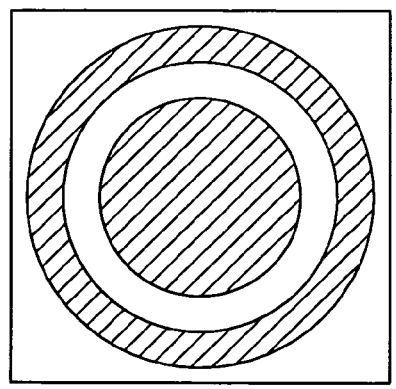
FIGS. 2A and 2B are diagrams showing examples of images input into and output from a lens having a large distortion aberration, which is installed in the image capturing apparatus of the first embodiment.

When a circular pattern as shown in FIG. 2A is photographed using a focusing lens 1 in FIG. 1, an optical image is output (see FIG. 2B) which has a distortion aberration in a manner such that a central part of the pattern is expanded while a peripheral part is optically compressed. With respect to the compression, the larger the distance from the center of the image, the greater the degree of compression.

The optical image output from the focusing lens 1 is incident on an image sensor 2 (i.e., a solid imaging device such as a CCD), so that it is imaged as a subject image on an image plane of the image sensor 2. In the image sensor 2, pixels are matrix-arranged, and color filters are also arranged. The image sensor 2 is controlled and driven by a CCD driver 12 so that the subject image is photoelectrically converted to electrical signals (called "image signals" below).

Each image signal output from the image sensor 2 is converted to a digital signal by an A/D converter (i.e., an A/D converting device), and is further converted into a brightness signal by a brightness signal generating circuit 4.

Figure 3:
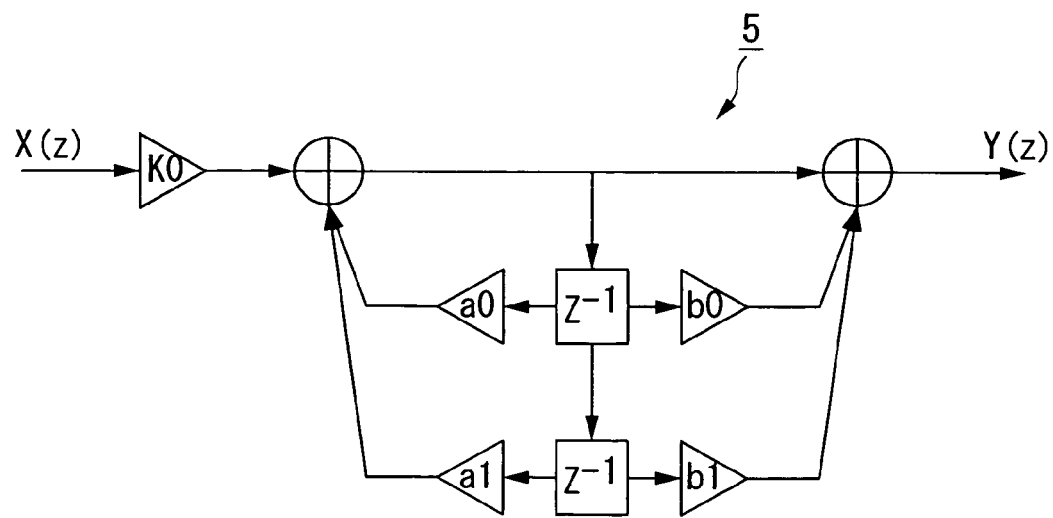
FIG. 3 is a diagram showing the structure of the high-pass filter installed in the image capturing apparatus of the first embodiment.

With respect to the brightness signal generated by the brightness signal generating circuit 4, only high-frequency signal components are extracted by a high-pass filter 5 (i.e., a filtering device). The high-pass filter 5 may have a structure as shown in FIG. 3, in which coefficients K0, a0, a1, b0, and b1 of multipliers are supplied from a CPU 10 via a data holder 7 and a switching device 6.

As the set of the coefficients K0, a0, a1, b0, and b1 of the high-pass filter 5, which are supplied from the CPU 10, the data holder 7 holds two types: one is used for an expanded image area (i.e., a central part of the image), and the other is used for a compressed image area (i.e., a peripheral part of the image). That is, the data holder 7 holds: (i) first filtering coefficients for cutting first low-frequency signal components having frequencies equal to or smaller than a first frequency, and (ii) second filtering coefficients for cutting second low-frequency signal components having frequencies equal to or smaller than a second frequency which is higher than the first frequency.

The switching device 6, controlled by the CPU 10, performs switching of the set of the coefficients retrieved from the data holder 7, and provides the retrieved coefficients to the high-pass filter 5. The switching device 6, the data holder 7, and a relevant part of the functions of the CPU 10 form an embodiment of the filter coefficient setting device of the present invention.

An area divider 8 (i.e., an area dividing device), controlled by the CPU 10, generates a control signal for distributing the image signals (each output from the high-pass filter 5) into a plurality of areas (e.g., 5×5 areas shown in FIG. 4), based on predetermined area data. That is, each divided area for executing an integral is set in an integrator 9 by the area divider 8. In accordance with the control of the area divider 8, the brightness signals, each having only the high-frequency signal components extracted by the high-pass filter 5, are integrated for each divided area by the integrator 9 (i.e., an integration device), and results of the integral are read out by the CPU 10 as evaluation values for focusing control. Based on the read-out evaluation values, the CPU 10 determines the position of the focusing lens 1 by using the hill-climbing control method or the like, and controls a motor 11. The above function of the CPU 10 and the motor 11 form an embodiment of the control device of the present invention.

FIGS. 5A to 5D show cut-off frequencies of the high-pass filter 5, and the evaluation values obtained by the integrator 9.

FIG. 5A shows characteristics of a high-pass filter having a low cut-off frequency. FIG. 5B shows a variation in the evaluation value (obtained for each divided area) with respect to the position of the focusing lens 1, in an image having a large number of low-frequency signal components. FIG. 5C shows characteristics of a high-pass filter having a high cut-off frequency. FIG. 5D shows a variation in the evaluation value (obtained for each divided area) with respect to the position of the focusing lens 1, in an image having a large number of high-frequency signal components.

When photographing using a camera or the like, which employs a lens (i.e., the focusing lens 1) having a large distortion aberration employed in the present embodiment, the central part of the image, where the image is expanded, has a large number of low-frequency signal components. In addition, the image is gradually compressed toward the peripheral edge of the image; thus, the peripheral part has a large number of high-frequency signal components. If the whole image is processed using high-pass filters having the same characteristics so as to control the focusing, it is difficult to detect a peak of the variation in the evaluation value with respect to the central part of the image because in this case the variation when the focusing lens is moved is relatively small (see FIG. 5B).

In contrast, the peripheral part of the image has a large number of high-frequency signal components; thus, the variation in the evaluation value when the focusing lens is moved is sharp (see FIG. 5D) so that the peak of the evaluation value can be easily detected. Therefore, it is necessary to assign high-pass filters having different characteristics to the central and peripheral parts of the image.

That is, for the central part of the image, a high-pass filter having a low cut-off frequency (see FIG. 5A) is used for easily detecting the peak, while for the peripheral part of the image, a high-pass filter having a high cut-off frequency (see FIG. 5C) is used.

The CPU 10 controls the switching device 6 so that the coefficients for implementing the high-pass filter having a low cut-off frequency are selected with respect to an image area (i.e., the central part of the image) for which an expanded image is input into the image sensor 2 due to the distortion aberration of the focusing lens 1. In contrast, the CPU 10 controls the switching device 6 so that the coefficients for implementing the high-pass filter having a high cut-off frequency are selected with respect to an image area (i.e., the peripheral part of the image) for which a compressed image is input into the image sensor 2 due to the distortion aberration of the focusing lens 1. Accordingly, even in the central part of the image having a large number of low-frequency signal components, the peak of the variation in the evaluation value in accordance with the movement of the focusing lens 1 can be detected, thereby more accurately detecting the focal position.

As discussed above, in accordance with the present embodiment, when an image in which the central part is expanded and the peripheral part is compressed due to the lens having a distortion aberration is input, the characteristics of the high-pass filter used are changed. That is, with respect to the central part corresponding to the image having a large number of low-frequency signal components, a high-pass filter, to which the first filter coefficients for implementing a low cut-off frequency are provided, is used for extracting signals belonging to a lower frequency range. Accordingly, even in the central part, an edge of the image signals for detecting the focal position can be detected, thereby allowing easy detection of the focal position. Therefore, it is possible to perform more accurate focusing control.

Figure 6:
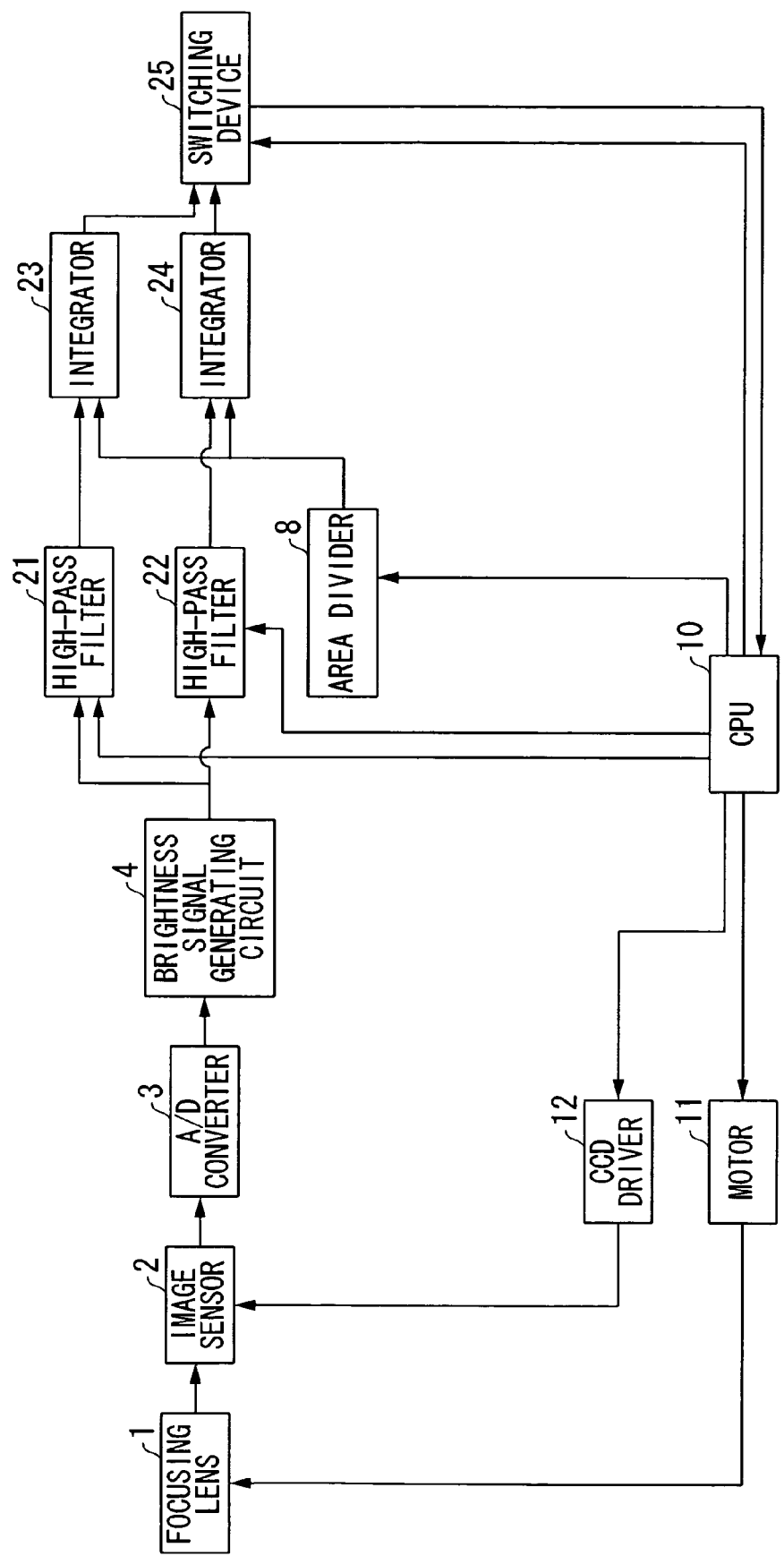
FIG. 6 is a block diagram showing the structure of a variation of the image capturing apparatus of the first embodiment.

A variation of the present embodiment will be explained below. FIG. 6 shows the structure of the image capturing apparatus of the variation. In this variation, a plurality of units are provided, each consisting of a high-pass filter and an integrator for obtaining the evaluation value used for the focusing control (in FIG. 6, two units are provided).

Each high-pass filter has unique characteristics, and the area division and integration processes are performed for signals output from each high-pass filter. In the central part of the image, results of the integral are obtained through a high-pass filter having a low cut-off frequency, while in the peripheral part of the image, results of the integral are obtained through a high-pass filter having a high cut-off frequency.

That is, the CPU 10 controls a switching device 25 (i.e., an integral output switching device) so that the result of the integral of an integrator (23 or 24) through a corresponding high-pass filter (21 or 22) having a low cut-off frequency is selected with respect to an image area for which an expanded image is input into the image sensor 2 due to the distortion aberration of the focusing lens 1.

In contrast, the CPU 10 controls the switching device 25 so that the result of the integral of the integrator through the corresponding high-pass filter having a high cut-off frequency is selected with respect to an image area for which a compressed image is input into the image sensor 2 due to the distortion aberration of the focusing lens 1.

The area for which the integrator 23 or 24 executes the integral is determined by the area divider 8.

In accordance with the present variation employing the plurality of the units, each consisting of the high-pass filter and the integrator, the evaluation values for each divided area can be computed through parallel processing. Therefore, focusing can be performed more quickly.

The high-pass filters of the plurality of the units may have identical characteristics (e.g., a plurality of high-pass filters 5 of the first embodiment and corresponding integrators may be provided). Also in this case, parallel processing can be performed and thus focusing can be performed more quickly.

In either case of the present embodiment, with respect to the central part of the image, the high-pass filter (5, 21, or 22) may have a characteristic for also cutting signal components having frequencies equal to or higher than a third frequency which is higher than the first frequency. With respect to the central part of the image, an expanded image is input so that signals belonging to the central part have a large number of low-frequency signal components and a small number of high-frequency signal components. Therefore, the evaluation value is not considerably influenced even when cutting the high-frequency signal components. Therefore, when the high-pass filter is set for the central part of the image to function as a band-pass filter for cutting the frequency components which have frequencies equal to or higher than the third frequency, noise components superimposed on the high-frequency signal components can be removed, thereby resulting in more accurate focusing control.

Figure 7:
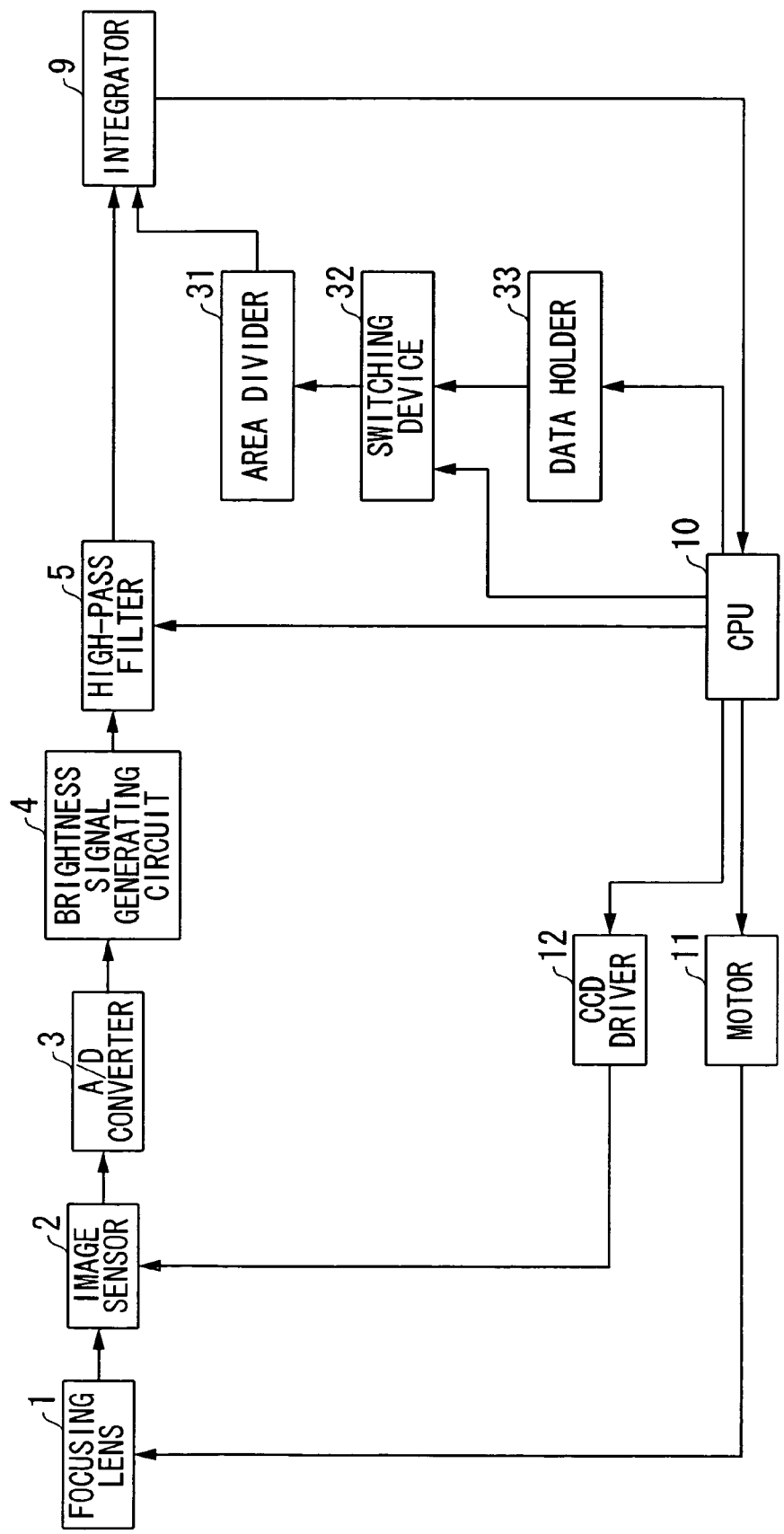
FIG. 7 is a block diagram showing the structure of the image capturing apparatus as a second embodiment in accordance with the present invention.

Below, a second embodiment of the present invention will be explained. FIG. 7 shows the structure of the image capturing apparatus of the present embodiment.

The structure of the high-pass filter 5 is the same as that of the first embodiment and thus may be shown in FIG. 3, so that the coefficients K0, a0, a1, b0, and b1 are supplied by the CPU 10.

Figure 8A:
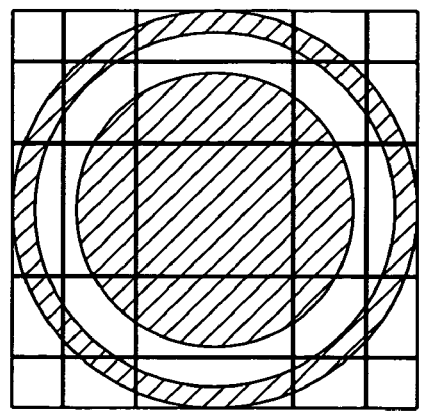
FIGS. 8A to 8C are diagrams showing examples of image area division so as to explain the operation of the image capturing apparatus of the second embodiment.

To an area divider 31, a control signal for distributing the image signals (output from the high-pass filter 5) into a plurality of areas (e.g., 5×5 areas as shown in FIG. 8A), is provided by control of the CPU 10, via a switching device 32 and a data holder 33.

The CPU supplies parameters (i.e., area data), such as a horizontal width and a vertical width for determining the size of each divided area, to the data holder 33, which holds the parameters.

The switching device 32, controlled by the CPU 10, switches the parameters to be retrieved from the data holder 33, and provides the retrieved parameters (for determining the size of the divided area) to the area divider 31.

In accordance with the control of the area divider 31, the brightness signals, each having only the high-frequency signal components extracted by the high-pass filter 5, are integrated for each divided area by the integrator 9, and results of the integral are read out by the CPU 10 as the evaluation values used for the focusing control. Based on the readout evaluation values, the CPU 10 determines the position of the focusing lens 1 by using the hill-climbing control method or the like, and controls the motor 11.

Below, an operation of the image capturing apparatus for photographing a circular pattern will be explained with reference to FIGS. 8A to 8C.

Figure 2B:
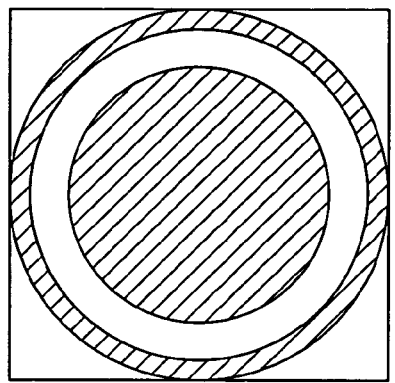

FIG. 8A shows an example of the area division of the image plane, performed in the present embodiment. More specifically, this example shows a result of the area division applied to the image as shown in FIG. 2B, where this image is output from the focusing lens 1 when the image as shown in FIG. 2A is incident on the focusing lens 1. The area division is controlled by the area divider 31.

Figure 8B:
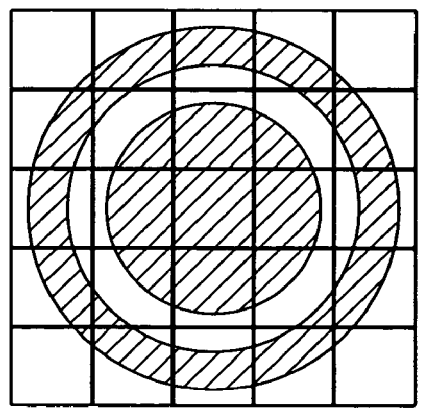

FIG. 8B shows an example of the area division, obtained when the image plane is uniformly divided based on the image incident on the focusing lens 1.

Figure 8C:
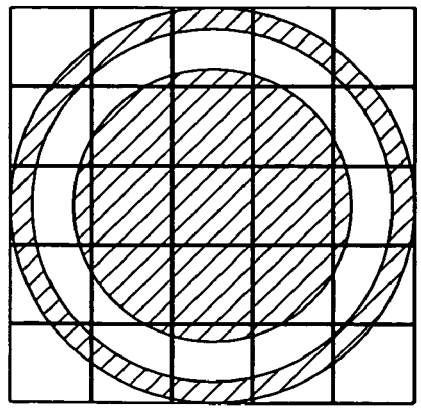

FIG. 8C shows an example of the area division, obtained when the image plane is uniformly divided based on the image output from the focusing lens 1.

When photographing using a camera or the like, which employs a lens (i.e., the focusing lens 1) having a large distortion aberration employed in the present embodiment, the image is expanded in the central part of the image, and in contrast, the image is compressed toward the peripheral edge of the image. If the evaluation values for the focusing control are obtained using uniform divided areas over the whole image, then (i) in the central part of the image, the evaluation values are actually obtained using areas smaller than those of the desired areas which are divided based on the image incident on the focusing lens 1, and (ii) in the peripheral part of the image, the evaluation values are actually obtained using areas larger than those of the desired areas which are divided based on the image incident on the focusing lens 1, as discussed below.

For example, when comparing the example of FIG. 8B (showing the uniform area division based on the image incident on the focusing lens 1) and the example of FIG. 8C (showing the uniform area division based on the image output from the focusing lens 1 having the distortion aberration) with each other, in the central part of FIG. 8C, the evaluation values are obtained using areas smaller than those of the desired area in comparison with FIG. 8B, and in the peripheral part of FIG. 8C, the evaluation values are obtained using areas larger than those of the desired area in comparison with FIG. 8B. Therefore, it is necessary to determine the size of each divided area based on an obtained image incident on the focusing lens 1, which is not affected by the distortion aberration.

That is, in order to reduce the influence of the distortion aberration of the focusing lens 1, the CPU 10 makes the data holder 33 hold the parameters (such as the horizontal width and the vertical width) for determining the size of each divided area, and the switching device 32 appropriately retrieves the parameters from the data holder 33 in accordance with the area assigned to the present image signal, and provides them to the area divider 31.

As discussed above, in order to determine the areas as shown in FIG. 8B which are divided based on the image incident on the focusing lens 1, the area divider 31, the switching device 32, and the data holder 33 are controlled so that each divided area has a size as shown in FIG. 8A in the central and peripheral part of the output image. Therefore, it is possible to detect the focal position more accurately. The area divider 31, the switching device 32, the data holder 33, and the relevant function of the CPU 10 form the area dividing device of the present invention.

Therefore, in accordance with the present embodiment, when an image is input, whose central part is expanded and whose peripheral part is compressed due to the lens having a distortion aberration, the size of each divided area (set in the separator 9) for executing the integral is determined in accordance with the distortion aberration characteristics of the lens. Therefore, it is possible to reduce non-uniformity in the frequency components between the divided areas due to the distortion aberration characteristics of the optical system, and thus the focusing control can be performed more accurately.

Figure 9:
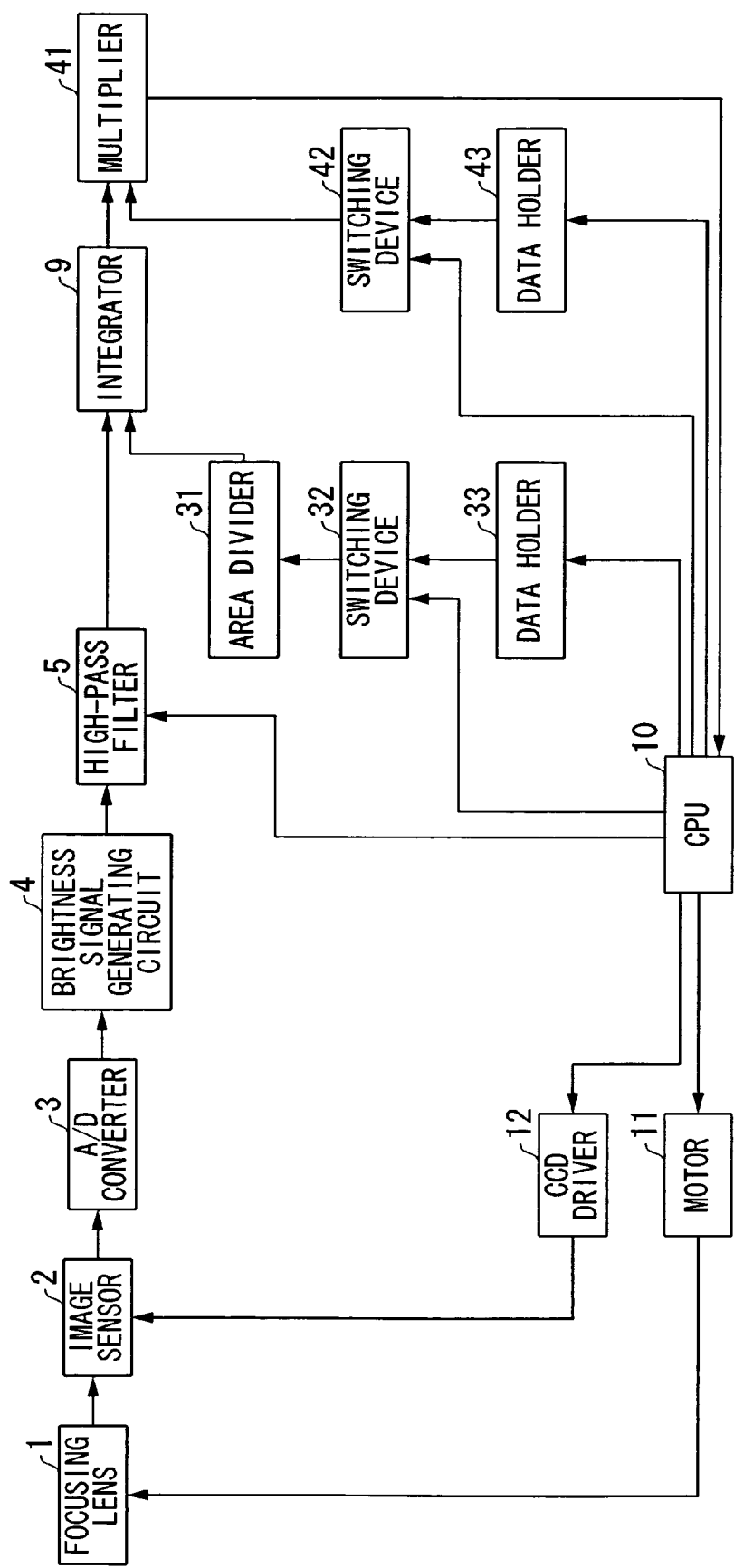
FIG. 9 is a block diagram showing the structure of a variation of the image capturing apparatus of the second embodiment.

A variation of the present embodiment will be explained. FIG. 9 shows the structure of the image capturing apparatus of the variation. In this variation, a multiplier 41 is further provided, which multiplies each result of the integral by a normalization coefficient for making the characteristics of each divided area uniform, so as to obtain each evaluation value used for the focusing control.

That is, in order to reduce the influence of the distortion aberration of the focusing lens 1, the CPU 10 makes a data holder 43 hold normalization coefficients respectively assigned to the divided areas, each coefficient being determined in accordance with the size of each divided area. In accordance with the area assigned to the present image signal, a switching device 42 retrieves a parameter (i.e., the normalization coefficient), and supplies it to a multiplier 41. The multiplier 41, the switching device 42, the data holder 43, and the relevant function of the CPU 10 form an embodiment of the multiplication device of the present invention.

The normalization coefficients are provided for correcting an apparent difference between the evaluation values due to a difference in the size of each divided area, that is, a difference in the number of pixels used in the multiplication. Therefore, they are provided for converting each divided area into an area having the same number of pixels, and thus the normalization coefficient is inverse-proportional to the size of the divided area.

In accordance with the present variation, even when an image whose central part is expanded and whose peripheral part is compressed is input due to the lens having a distortion aberration, the focal position can be easily detected using the multiplier for making the characteristics of each divided area conform to each other. That is, the evaluation value obtained for each divided area is multiplied by a coefficient for normalizing the evaluation value in accordance with the size of the relevant divided area, thereby removing the influence of the distortion aberration and performing more accurate focusing control.

Figure 10:
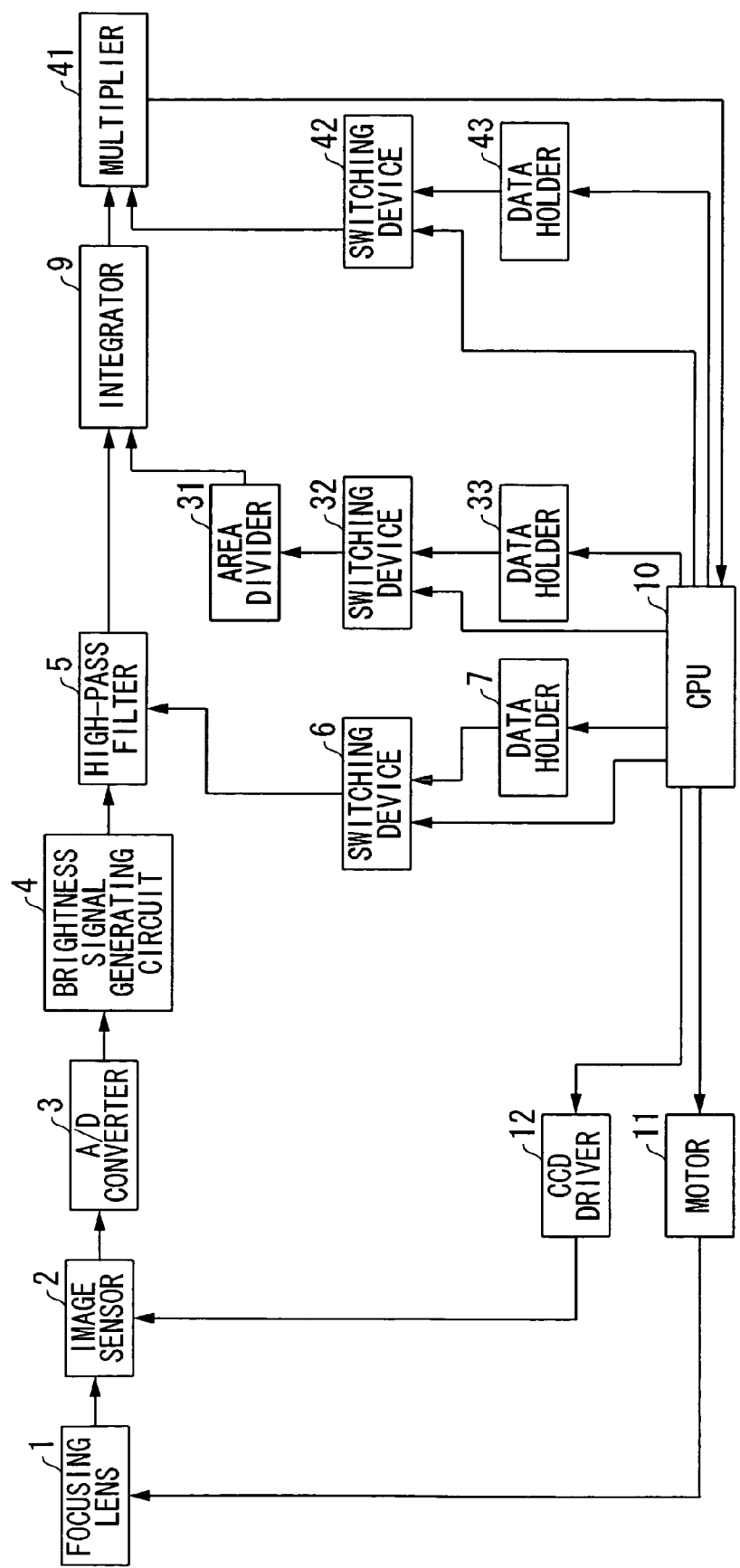
FIG. 10 is a block diagram showing the structure of another variation of the image capturing apparatus of the second embodiment.

FIG. 10 shows the structure of the image capturing apparatus as another variation. In this variation, the characteristics of the high-pass filter can be changed for each divided area, that is, for the area belonging to the central part of the image, a high-pass filter having a low cut-off frequency is used, while for the area belonging to the peripheral part of the image, a high-pass filter having a high cut-off frequency is used. In this variation, the switching device 6 and the data holder 7 employed in the first embodiment (see FIG. 1) are provided.

That is, in the image area where the expanded image due to the distortion aberration of the focusing lens 1 is input into the image sensor 2, the CPU 10 controls the switching device 6 to select the coefficients for providing a high-pass filtering operation using a low cut-off frequency. In contrast, in the image area where the compressed image due to the distortion aberration of the focusing lens 1 is input into the image sensor 2, the CPU 10 controls the switching device 6 to select the coefficients for providing a high-pass filtering operation using a high cut-off frequency. Each set of the coefficients is stored into the data holder 7 by the CPU 10 in advance, and is supplied to the high-pass filter 5 via the switching device 6.

In accordance with the present variation, in the central part of the image, a high-pass filter is used in which the first filter coefficients corresponding to a low cut-off frequency are set for processing an image having a large number of low-frequency signal components and extracting signals belonging to a lower frequency range. Therefore, even in the central part having a large number of low-frequency signal components, a necessary edge of the image signals can be detected so as to detect a peak of the evaluation value, which appears in accordance with the movement of the focusing lens 1. Therefore, it is possible to more accurately perform the detection of the focal position, and the focusing control.

Figure 11:
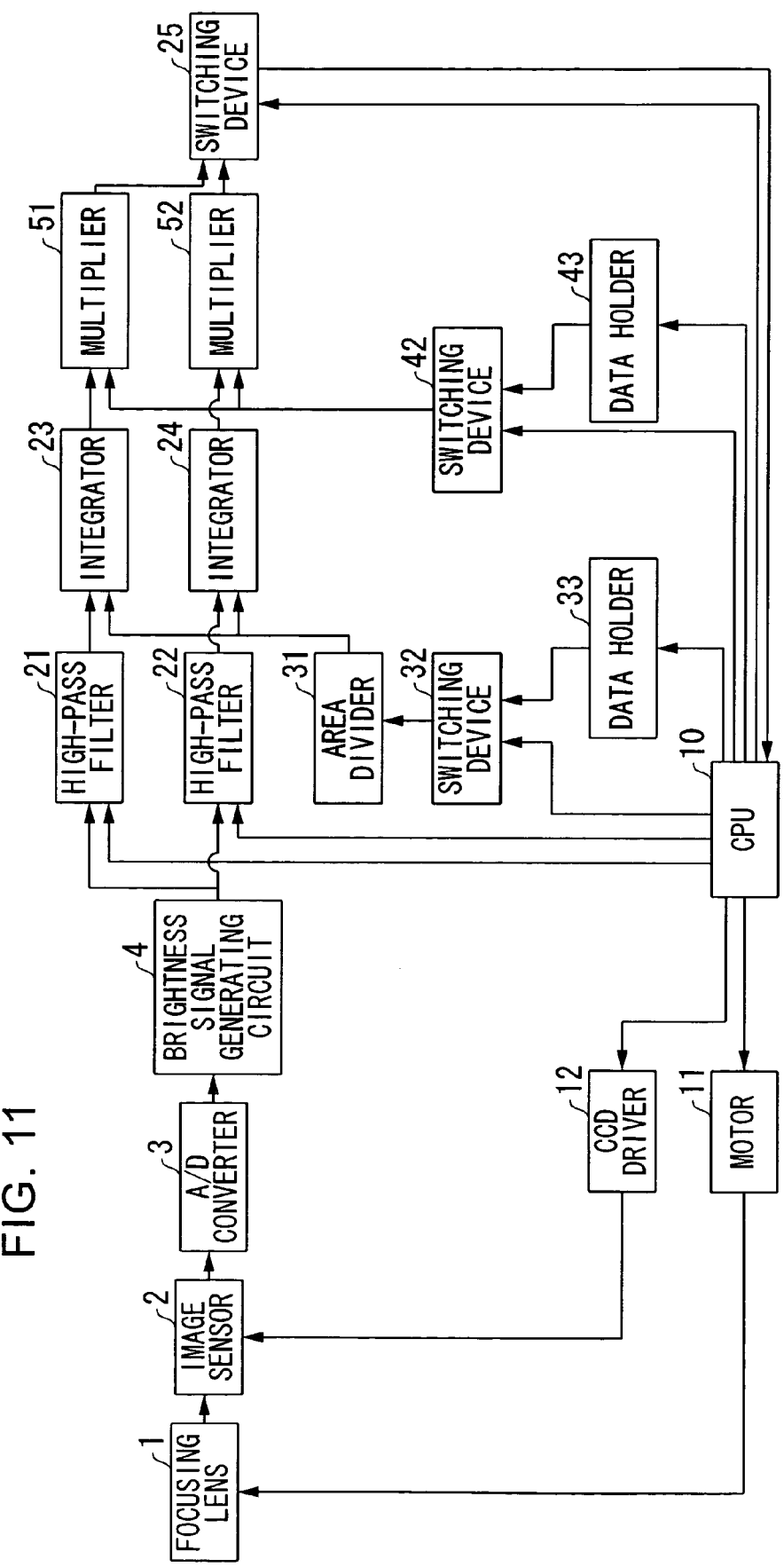
FIG. 11 is a block diagram showing the structure of another variation of the image capturing apparatus of the second embodiment.
Figure 12:
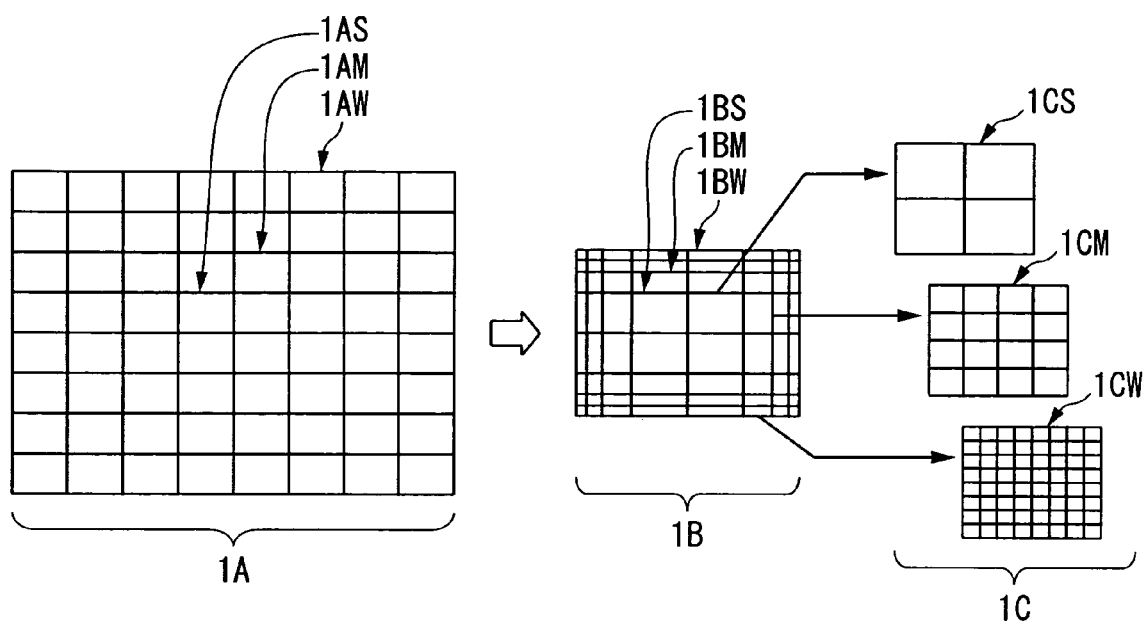
FIG. 12 is a diagram explaining an example of the characteristics of a lens having a large distortion aberration.
Figure 13:
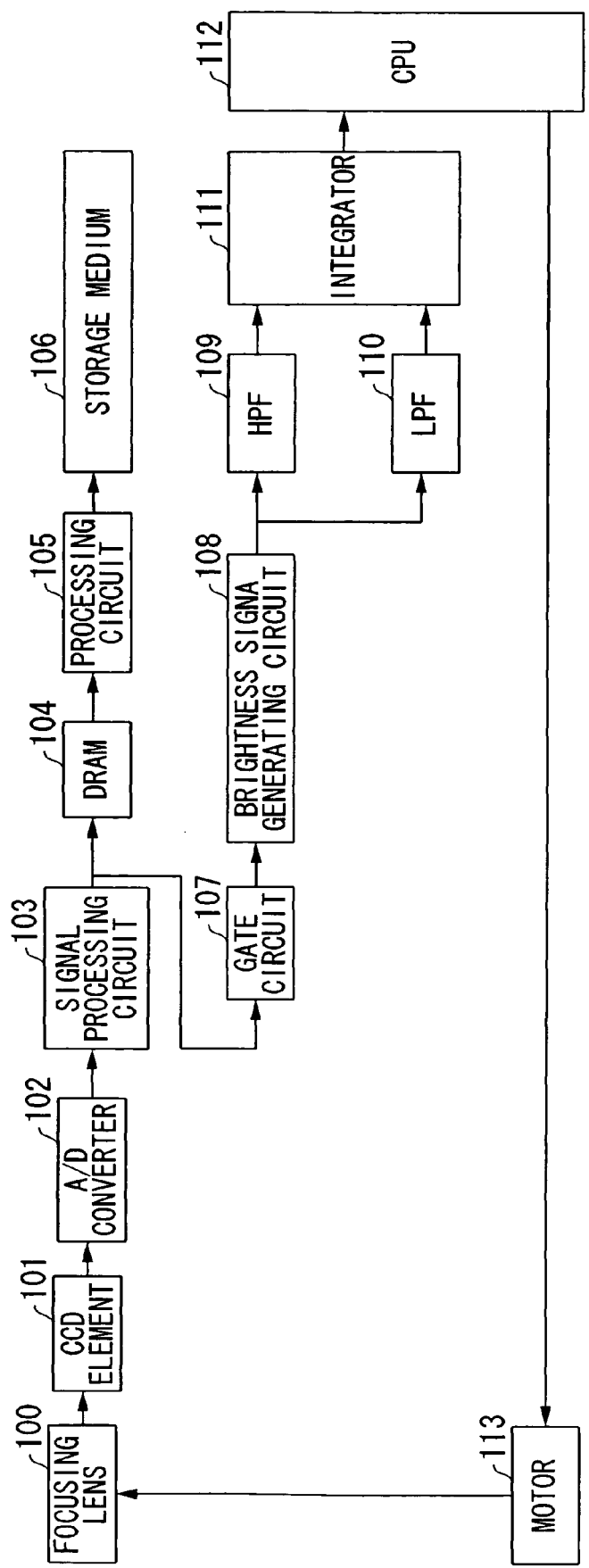
FIG. 13 is a block diagram showing the structure of a conventional image capturing apparatus.

FIG. 11 shows the structure of the image capturing apparatus as another variation. In this variation, a plurality of units are provided, each consisting of a high-pass filter, a separator, and a multiplier for obtaining each evaluation value used for the focusing control. Each high-pass filter has unique characteristics, and each signal output from the high-pass filter is subjected to the area-division and integration processes. In the central part of the image, results of the integral obtained through a high-pass filter having a low cut-off frequency are used, and in the peripheral part of the image, results of the integral obtained through a high-pass filter having a high cut-off frequency are used. In the present variation, the high-pass filters 21 and 22 and the integrators 23 and 24 are provided similar to the variation (see FIG. 6) of the first embodiment. In addition, multipliers 51 and 52 are provided for multiplying each result of the integral (executed by each integrator) by a coefficient for normalizing the result in accordance with the size of the divided area relating to the result.

The CPU 10 controls the switching device 25 so that the result of the integral of the integrator (23 or 24) through the corresponding high-pass filter (21 or 22) having a low cut-off frequency is selected with respect to an image area for which an expanded image is input into the image sensor 2 due to the distortion aberration of the focusing lens 1. In contrast, the CPU 10 controls the switching device 25 so that the result of the integral of the integrator through the corresponding high-pass filter having a high cut-off frequency is selected with respect to an image area for which a compressed image is input into the image sensor 2 due to the distortion aberration of the focusing lens 1.

The area for which the integrator 23 or 24 executes the integral is determined by the area divider 31. In addition, similar to the above-described variation as shown in FIG. 9, the CPU 10 makes the data holder 43 store the normalization coefficients respectively assigned to the divided areas, in accordance with the size of each divided area, so as to reduce the influence of the distortion aberration of the focusing lens 1. In accordance with the area assigned to each image signal processed by the high-pass filter 21, the switching device 42 retrieves an appropriate parameter from the data holder 43 and supplies it to the multiplier 51. Similarly, in accordance with the area assigned to each image signal processed by the high-pass filter 22, the switching device 42 retrieves an appropriate parameter from the data holder 43 and supplies it to the multiplier 52.

In accordance with the present variation providing the plurality of units, each consisting of the high-pass filter, the integrator, and the multiplier, the evaluation values for each divided area can be computed through parallel processing. Therefore, the focusing can be performed more quickly. Additionally, even when an image whose central part is expanded and whose peripheral part is compressed is input due to the lens having a distortion aberration, the focal position can be easily detected using each multiplier for making the characteristics of each divided area conform to each other. That is, the evaluation value obtained for each divided area is multiplied by a coefficient for normalizing the evaluation value in accordance with the size of the relevant divided area, thereby removing the influence of the distortion aberration and performing more accurate focusing control.

In either case of the present embodiment, with respect to the central part of the image, the high-pass filter (5, 21, or 22) may have a characteristic for also cutting signal components having frequencies equal to or higher than a third frequency which is higher than the first frequency. As discussed above, when the high-pass filter is set for the central part of the image to function as a band-pass filter for cutting the frequency components having frequencies equal to or higher than the third frequency, noise components superimposed on the high-frequency signal components can be removed, thereby resulting in more accurate focusing control.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In accordance with the present invention, in the central part of the image, which corresponds to an image having a large number of low-frequency signal components, a filtering device to which the first filter coefficients are provided is used for extracting signals belonging to a lower frequency range. Therefore, even in the central part, a necessary edge in the image signals can be detected so that the focusing control can be performed more accurately.

Also in accordance with the present invention, the size of each divided area for executing the integral by the integration device can be determined in accordance with the distortion aberration characteristics of the optical system. Therefore, it is possible to reduce non-uniformity in the frequency components between the divided areas due to the distortion aberration characteristics of the optical system, and thus the focusing control can be performed more accurately.

What is claimed is:

1. An image capturing apparatus comprising:
    an optical system having distortion aberration characteristics for expanding a central part and compressing a peripheral part of an object to be photographed;
    an image sensor for photodetecting an optical image obtained through the optical system, converting the optical image to image signals, and outputting the image signals;
    an A/D converting device for converting each image signal output from the image sensor into a digital signal;
    a filtering device for performing a filtering process for cutting low-frequency signal components of the image signal which has been converted into the digital signal;
    a filter coefficient setting device for selecting and assigning:
        first filter coefficients for cutting the low-frequency signal components, which have frequencies equal to or lower than a first frequency, to an image area corresponding to the central part, and
        second filter coefficients for cutting the low-frequency signal components, which have frequencies equal to or lower than a second frequency which is higher than the first frequency, to an image area corresponding to the peripheral part, wherein the filter coefficient setting device provides the selected filter coefficients to the filtering device;
    an integration device for integrating each image signal which was subjected to the filtering process by the filtering device, so as to generate an evaluation value;
    an area dividing device for performing area division based on area data relating to divided areas formed by dividing an effective image area into smaller areas, wherein the area dividing device sets each divided area for executing the integral and generating the evaluation value, for the integration device; and
    a control device for controlling focusing of the optical system based on the evaluation value with respect to each divided area.

2. The image capturing apparatus in accordance with claim 1, further comprising:
    a plurality of units, each unit including the filtering device and the integration device, for generating the evaluation values assigned to different divided areas; and
    an integral output switching device for selecting one of the units and providing a signal output from the selected unit to the control device.

3. The image capturing apparatus in accordance with claim 2, wherein the filtering devices of the units have different cut-off frequencies.

4. The image capturing apparatus in accordance with claim 1, wherein the filtering device has a further setting in which with respect to the image area corresponding to the central part, high-frequency signal components which have frequencies equal to or higher than a third frequency higher than the first frequency are also cut.

5. An image capturing apparatus comprising:
   an optical system having distortion aberration characteristics for expanding a central part and compressing a peripheral part of an object to be photographed;
   an image sensor for photodetecting an optical image obtained through the optical system, converting the optical image to image signals, and outputting the image signals;
   an A/D converting device for converting each image signal output from the image sensor into a digital signal;
   a filtering device for performing a filtering process for cutting low-frequency signal components of the image signal which has been converted into the digital signal;
   an integration device for integrating each image signal which was subjected to the filtering process by the filtering device, so as to generate an evaluation value;
   an area dividing device for performing area division based on area data relating to sizes of divided areas formed by dividing an effective image area into smaller areas in accordance with the distortion aberration characteristics, wherein the area dividing device sets each divided area for executing the integral and generating the evaluation value, for the integration device; and
   a control device for controlling focusing of the optical system based on the evaluation value with respect to each divided area.

6. The image capturing apparatus in accordance with claim 5, further comprising:
   a filter coefficient setting device for selecting and assigning:
      first filter coefficients for cutting the low-frequency signal components, which have frequencies equal to or lower than a first frequency, to an image area corresponding to the central part, and
      second filter coefficients for cutting the low-frequency signal components, which have frequencies equal to or lower than a second frequency which is higher than the first frequency, to an image area corresponding to the peripheral part, wherein the filter coefficient setting device provides the selected filter coefficients to the filtering device.

7. The image capturing apparatus in accordance with claim 5, further comprising:
   a multiplication device for multiplying the evaluation value by a coefficient for normalizing the evaluation value in accordance with the size of each divided area.

8. The image capturing apparatus in accordance with claim 5, further comprising:
   a plurality of units, each unit including the filtering device and the integration device, for generating the evaluation values assigned to different divided areas; and
   an integral output switching device for selecting one of the units and providing a signal output from the selected unit to the control device.

9. The image capturing apparatus in accordance with claim 8, further comprising:
   a multiplication device, provided for each unit, for multiplying the evaluation value by a coefficient for normalizing the evaluation value in accordance with the size of each divided area, wherein:
   the integral output switching device regards a signal output from the multiplication device assigned to each unit as a signal output from the unit, and provides the signal output from the selected unit to the control device.

10. The image capturing apparatus in accordance with claim 8, wherein the filtering devices of the units have different cut-off frequencies.

11. The image capturing apparatus in accordance with claim 6, wherein the filtering device has a further setting in which with respect to the image area corresponding to the central part, high-frequency signal components which have frequencies equal to or higher than a third frequency higher than the first frequency are also cut.

* * * * *